United States Patent [19]

Palmaer

[11] Patent Number: 4,742,907
[45] Date of Patent: May 10, 1988

[54] PLASTIC CONVEYOR BELT
[75] Inventor: Karl V. Palmaer, Folsom, Calif.
[73] Assignee: KVP Systems, Inc., Rancho Cordova, Calif.
[21] Appl. No.: 904,773
[22] Filed: Sep. 5, 1986

Related U.S. Application Data

[63] Continuation of Ser. No. 556,938, Dec. 1, 1983, abandoned, which is a continuation-in-part of Ser. No. 383,745, Jun. 1, 1982, abandoned.

[51] Int. Cl.⁴ .............................................. B65G 21/16
[52] U.S. Cl. .................................... 198/831; 198/837; 198/841; 198/852
[58] Field of Search ............................ 198/850–853, 198/831, 840, 841, 834, 837

[56]           References Cited
       U.S. PATENT DOCUMENTS

| | | | |
|---|---|---|---|
| 1,965,285 | 7/1934 | Gilstad | 198/852 X |
| 2,297,813 | 10/1942 | Stork | 198/852 |
| 2,465,929 | 3/1949 | Rixon | 198/850 |
| 3,094,206 | 6/1963 | Stewart et al. | 198/840 X |
| 3,155,226 | 11/1964 | Beiler | 198/831 |
| 3,368,662 | 2/1968 | Poerink | 198/837 |
| 3,529,715 | 9/1970 | Mueller | 198/852 |
| 3,641,831 | 2/1972 | Palmaer | 198/853 |
| 3,669,247 | 6/1972 | Pulver | 198/852 |
| 3,774,752 | 11/1973 | Harvey | 198/852 |
| 3,854,575 | 12/1974 | Fraioli | 198/831 |
| 3,870,141 | 3/1975 | Lapeyre et al. | 198/853 |
| 3,951,256 | 4/1976 | Gurewitz | 198/831 |
| 4,222,483 | 9/1980 | Wooton et al. | 198/831 |
| 4,276,980 | 7/1981 | Oizumi | 198/851 |
| 4,394,901 | 7/1983 | Roinestad | 198/850 |
| 4,438,838 | 3/1984 | Hodlewsky et al. | 198/853 |
| 4,556,142 | 12/1985 | Lapeyre | 198/853 X |

FOREIGN PATENT DOCUMENTS

| | | | |
|---|---|---|---|
| 113669 | 10/1900 | Fed. Rep. of Germany | 198/852 |
| 2306973 | 8/1973 | Fed. Rep. of Germany | 198/853 |
| 76794 | 12/1954 | Netherlands | 198/850 |

OTHER PUBLICATIONS

"Intralox, All Plastic Conveyor Belting", pp. 2–5 and 12.
"All in One Plastic Belt", KVP Catalogue.
Wiremation Catalogue, Lumsden Corp.

Primary Examiner—Joseph E. Valenza
Attorney, Agent, or Firm—Thomas M. Freiburger

[57]              ABSTRACT

A conveyor belt made of plastic modules capable of being integrally driven by sprocket wheels. The modules are elongated molded bodies having projections extending integrally from the opposite sides thereof. The projections of adjacent modules are interdigited and connected by rods. The modules are provided with cylindrical driving surfaces in transverse openings therethrough which openings are each aligned with a different projection on one side of the bodies. The combination of projections and driving openings provides a foraminous belt, upon interconnection of the modules, allowing free circulation of gases and liquids through the belt for processing of products carried thereby and for cleaning and sterilization of the belt. The belt may be adapted to traverse a curved path.

6 Claims, 4 Drawing Sheets

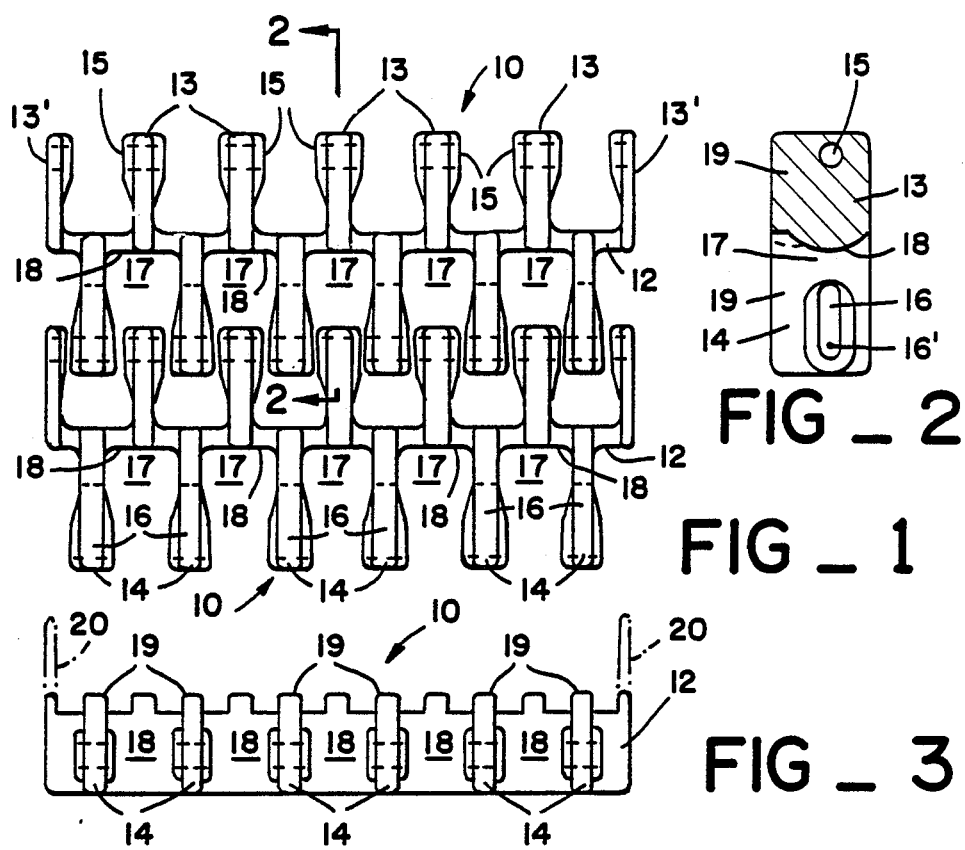
FIG _ 1
FIG _ 2
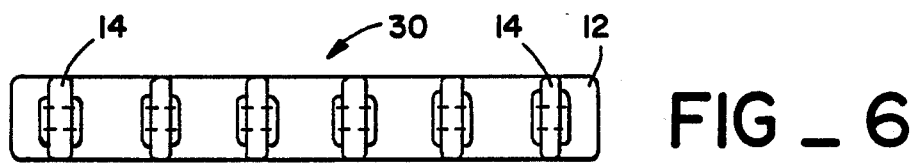
FIG _ 3
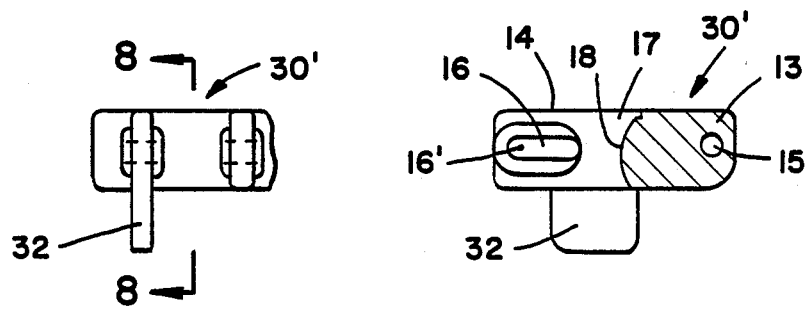
FIG _ 6
FIG _ 7
FIG _ 8

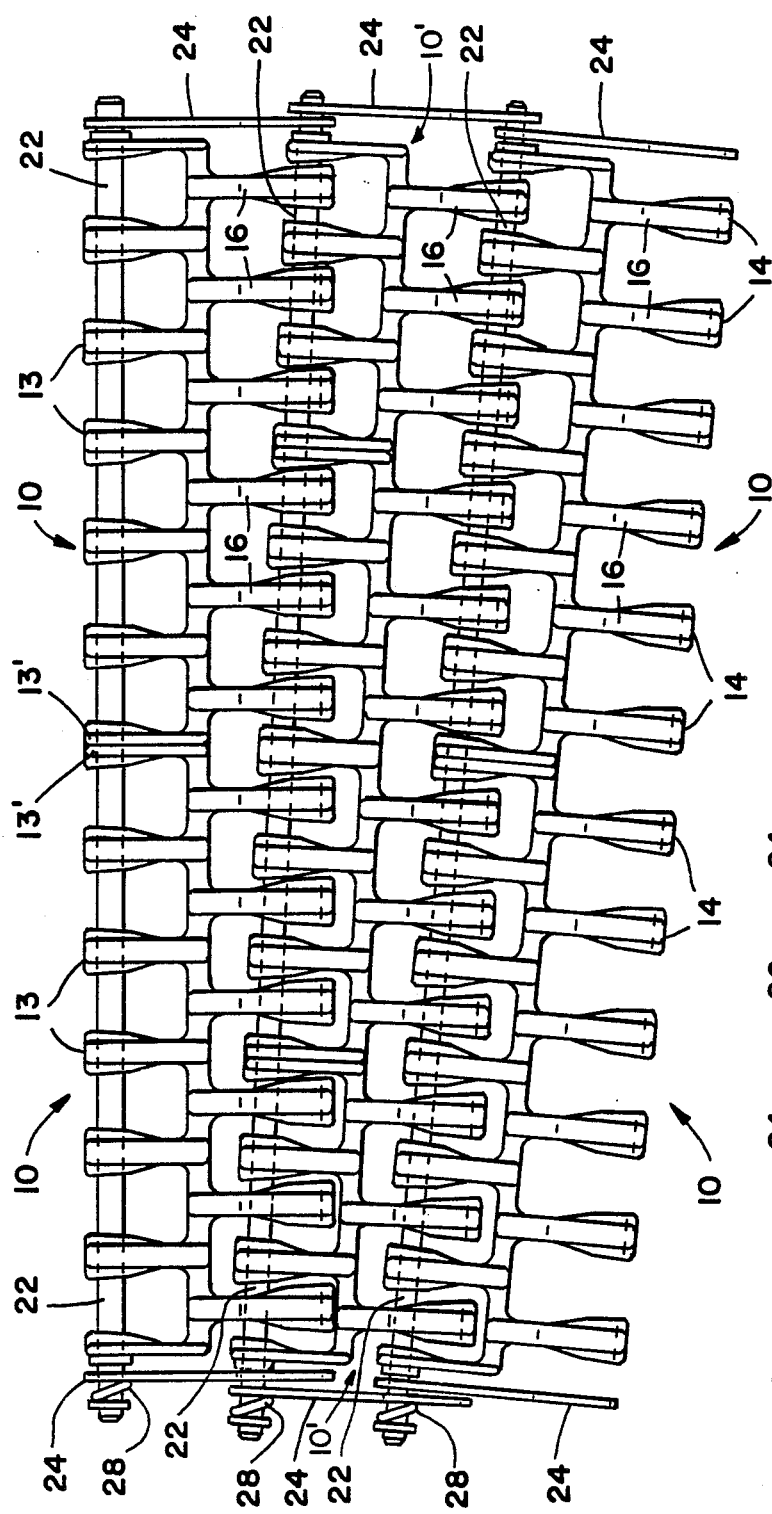
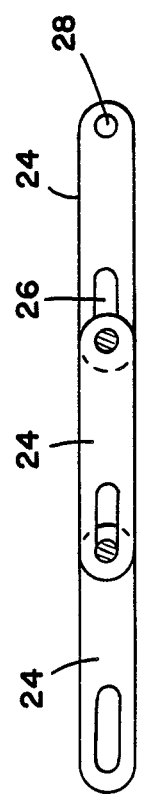

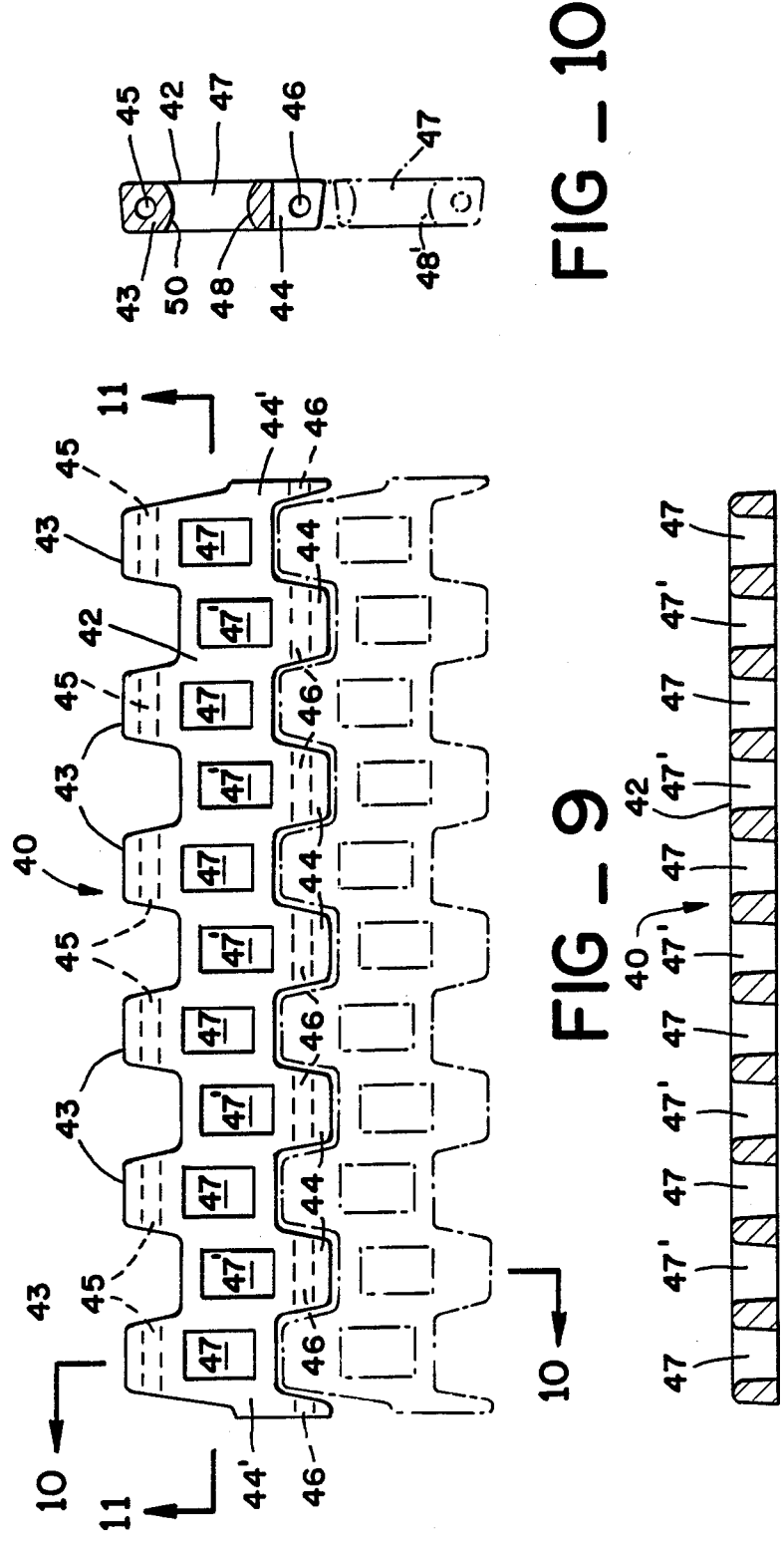

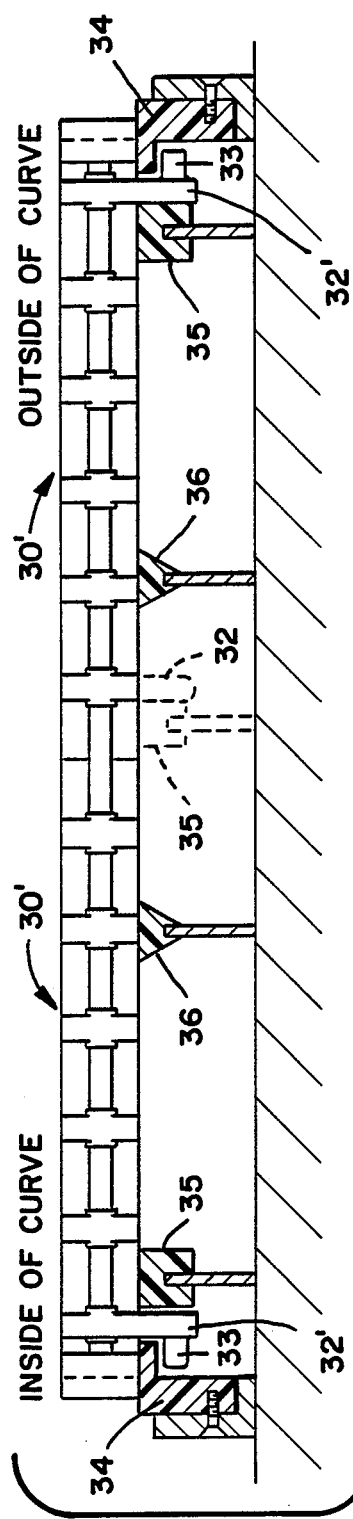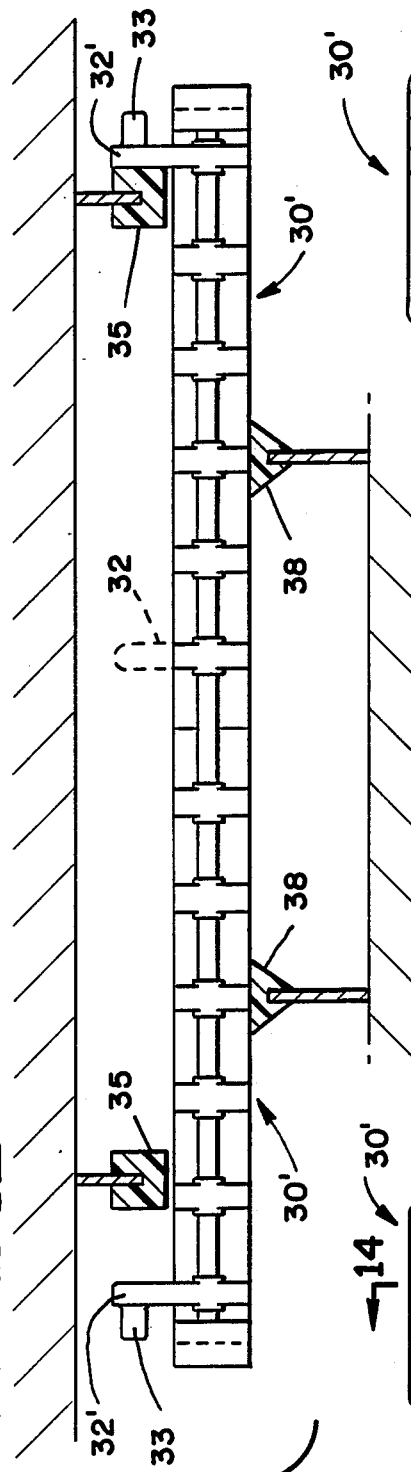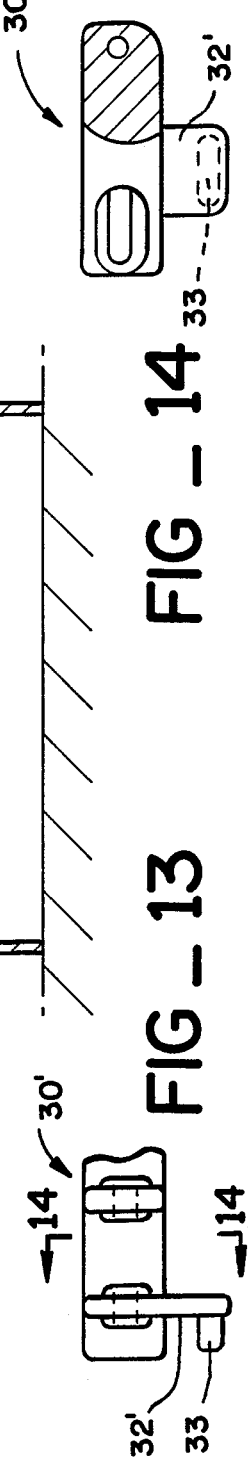

PLASTIC CONVEYOR BELT

CROSS-REFERENCE TO RELATED APPLICATION

This is a continuation of application Ser. No. 556,938, filed Dec. 1, 1983, now abandoned which was a continuation-in-part of my prior copending application Ser. No. 383,745, filed June 1, 1982, now abandoned for PLASTIC CONVEYOR BELT.

FIELD OF THE INVENTION

This invention relates to conveyor belts and more particularly to an integrally driven plastic conveyor belt.

BACKGROUND OF THE INVENTION

In many mass production processes known in the prior art, there is a need to subject products to process steps while they are being transported. For example, in baking bread, the loaves of raw dough must be "proofed", or allowed to rise, after formation and before baking. Similarly, after baking, the loaves must be allowed to cool before wrapping. Thus, there is a need to transport the individual loaves in large quantity while subjecting them to a flow of air in order to preserve the continuity of the mass production process. The need for the free circulation of air is particularly important where food stuffs are to be frozen after processing. Similarly, in many chemical processes, product units must be subjected to a flow of fluids while being transported in large quantity.

It is known in the prior art to use conveyor belts of various constructions to transport product units for processing. However, such prior art conveyor belt constructions have been difficult to maintain in the required clean and sanitary condition, or they have been complicated and expensive to manufacture and in either case, they have been difficult to drive. Thus, a simple continuous surface belt does not provide for the circulation of fluids about the product units, is difficult to clean and sterilize and does not provide for positive drive. The provision of apertures through the belt will enable the circulation of fluids therethrough for processing and cleaning or sterilizing purposes but will further complicate the application of driving forces to the belt.

It has been proposed in the prior art to attach drive chain to an apertured belt in order to provide for the application of drive forces to the belt. However, the difference in materials between the chain and the belt make it difficult to form and maintain a secure mechanical interconnection therebetween, particularly where the belt is subjected to temperature fluctuations in use or cleaning. In addition, the attachment of chain drive means complicates the cleaning and sterilization of the composite structure.

A closely related alternate structure proposed in the prior art is the provision of transversely extending apertured support elements mounted on each link of a drag chain or between corresponding links of a pair of parallel drag chains. This structure avoids the interconnection difficulties associated with the attachment of a chain to a belt but it presents additional difficulties in that the separation between adjacent support elements tends to collect product fragments thereby presenting additional cleaning and sterilization problems. In addition, the fabrication of the structure is complicated and expensive due to the number of elements involved which must be interconnected.

For the above reasons, it has been proposed in the prior art to construct a conveyor belt of a multiplicity of link elements, usually of metal, interconnected by a plurality of transverse pins. Such a structure is inherently foraminous providing for the circulation of fluids therethrough in use and cleaning. In addition, such a structure is inherently suited for conventional chain drive by the engagement of the teeth of sprocket wheels with the transverse pins. However, due to the multiplicity of its parts, the structure is expensive and complicated to construct and presents excessive difficulties in cleaning and sterilization, because of the interconnection between the parts.

This invention is directed to overcoming the shortcomings of the prior art as set forth above.

SUMMARY OF THE INVENTION

According to this invention, an integrally driven plastic conveyor belt is fabricated from a plurality of modules. Each module comprises a unitary elongated molded plastic body having a plurality of first equally spaced projections extending integrally from one side thereof. Each of said plurality of first projections has a generally cylindrical aperture therethrough with its axis extending transversely thereof and the apertures have their axes coaxial with each other. A plurality of second equally spaced projections extend from the opposite side of the elongated body in symmetric interdigital location with respect to the plurality of first projections. Each of the plurality of second projections has an aperture therethrough extending transversely thereof, providing an axis of rotation, which apertures are identical and have their axes of rotation in alignment with each other. A plurality of openings are formed through the elongated body transversely of the coaxial axes of the apertures through the plurality of first projections with each such opening located between a different pair of the plurality of second projections. A plurality of cylindrical driving surfaces are each formed in a different one of the plurality of openings for engagement with a sprocket tooth, the radius of each cylindrical driving surface being about three tenths of the pitch or spacing between the axes of the plurality of apertures through the plurality of first projections and the axes rotation of the plurality of apertures through the plurality of second projections.

BRIEF DESCRIPTION OF THE DRAWING

This invention will be more fully understood from the following detailed description of preferred embodiments thereof when read in conjunction with the appended drawings wherein:

FIG. 1 is a top plan view of two modules according to one embodiment of this invention, positioned with respect to each other to be interconnected to form a portion of a plastic conveyor belt according to this invention.

FIG. 2 is a cross-sectional view taken along lines 2—2 of FIG. 1.

FIG. 3 is a front view in elevation of one of the modules of FIG. 1.

FIG. 4 shows a plurality of modules according to the embodiment of FIG. 1 as interconnected with each other to form a portion of a plastic conveyor belt according to this invention with the modules positioned with respect to each other for negotiation of a curved path.

FIG. 5 is a right end view in elevation of FIG. 4.

FIG. 6 is a front view in elevation of a module according to another embodiment of this invention.

FIG. 7 is a fragmentary front end view of a module according to a further embodiment of this invention.

FIG. 8 is a cross-sectional view taken along lines 8—8 of FIG. 7.

FIG. 9 is a top plan view of a module according to yet another embodiment of this invention with a second such module shown in phantom in position to be interconnected with the first to form a portion of a plastic conveyor belt according to the teaching of this invention.

FIG. 10 is a cross-sectional view taken along line 10—10 of FIG. 9.

FIG. 11 is a cross-sectional view taken along line 11—11 of FIG. 9.

FIG. 12 is a cross-sectional view taken through a plastic conveyor belt according to this invention in the middle of a left hand curve as shown in FIG. 4 with the load bearing flight depicted at the top of the figure and the return flight depicted at the bottom of the figure. For clarity the modules closest to the viewer have been removed and the belt shown in full.

FIG. 13 is a fragmentary front end view of a module according to a further embodiment of this invention.

FIG. 14 is a cross-sectional view taken along line 14—14 of FIG. 13.

DETAILED DESCRIPTION OF PREFERRED EMBODIMENTS

Referring to FIG. 1, a top plan view of two modules 10 according to a preferred embodiment of this invention for use in fabricating an integrally driven plastic belt are shown in position to be interconnected with each other to form a longitudinal section of such belt. Each of such modules 10 comprises a unitary elongated molded plastic body 12. A plurality of first equally spaced projections 13 extend integrally from one side of the elongated body 12 and a plurality of second equally spaced projections 14 extend integrally from the opposite side of the elongated body 12 in symmetric interdigital location with respect to the plurality of first projections 13.

Each of the plurality of first projections has a generally cylindrical aperture 15 extending therethrough transversely of the projection with the axes of all of such apertures 15 being coaxial with each other. Similarly, each of the plurality of second projections has an aperture 16 extending transversely therethrough with all of the apertures 16 through the second projections 14 being identical to each other and providing axes of rotation 16' in alignment with each other. As best shown in FIG. 2, the apertures 16 through the second projections 14 may define an elongated slot extending parallel to the length dimension of the projections 13 and 14 for purposes which will be more fully described hereinafter.

A plurality of openings 17 are formed through the elongated body 12 extending transversely to the coaxial axes of the apertures 15 through the plurality of first projections 13. Each of the plurality of openings 17 is located between a different pair of the plurality of second projections 14 and in the embodiment of this invention shown in FIGS. 1 through 3 such opening 17 merges with and defines a continuation of the spacing between the plurality of second projections 14.

Each of the openings 17 is provided with a cylindrical driving surface 18 as best shown in FIG. 2 for engagement with the teeth of a sprocket wheel. The cylindrical driving surfaces 18 each have a radius which has its center spaced from the aperture 15 in the one of said plurality of first projections 13 associated therewith lying in the plane which includes the axis of the apertures 15 through said plurality of first projections 13 and the axes of rotation 16' of the apertures 16 through said plurality of second projections 14 and is about three tenths of the spacing between the axes of the apertures 15 through the plurality of first projections 13 and the axes of rotation 16' of the apertures 16 through the plurality of second projections 14. Thus, the plurality of first projections on one module 10 may be interdigited with the plurality of second projections on an identical module 10 as shown in FIG. 1 and the two modules 10 interconnected by passing a pintle (not shown in FIG. 1) through the apertures 13 and 16 of the interdigited projections of the respective modules to form a portion of a belt. The belt may be driven through the engagement of the teeth of one or more sprocket wheels (not shown) with the driving surfaces 18 of the openings 17 through the body 12 of the modules 10. It will be understood that the belt will normally be driven at the end of a flight of the belt and that the belt will wrap around the sprocket wheel or wheels so that multiple teeth of each sprocket wheel engage multiple ones of the driving surfaces 18 simultaneously.

In the enbodiment shown in FIGS. 1-3, the projections 13 and 14 may define ridges 19 projecting upwardly from the top of the elongated body 12 as best shown in FIG. 3. One or both of such ridges 19 will enhance the circulation of air and fluids about a product carried on top of the chain formed of such modules 10.

As best shown in FIG. 1, the modules 10 preferably include a further projection 13' at each end thereof substantially identical to the plurality of first projections 13 but having only half the width of the projections 13 of the first plurality. Such projections 13' may include an upwardly extending wall 20 as indicated in phantom in FIG. 3 to prevent product carried by a belt made of the modules 10 from falling off the sides of the belt. More importantly, the projections 13' of the modules 10 will enable a plurality of such modules 10 to be interconnected in end-to-end relationship in order to provide for the fabrication of belt of greater width. It will be understood that the modules 10 may have a length different from that shown in FIG. 1 as indicated by the modules 10' of FIG. 4 which are otherwise identical to the module 10.

Thus referring to FIG. 4, seven modules 10 and 10' as described hereinabove in connection with FIGS. 1 through 3, are shown interconnected in end-to-end relationship in two pairs and one group of three which are connected to each other in interdigited side-to-side relationship to form a section of belt. Thus the projections 13' of the modules 10 and 10' are adapted to abut each other to form a combined projection substantially identical to the plurality of projections 13. In an actual embodiment of this invention, the modules 10 have a length of six inches while the modules 10' have a length of three inches. The grouping of the modules as shown in FIG. 4 will stagger the abutment between the projections 13' at the ends of adjacent modules, thus tending to equalize stresses that may be produced in the belt during operation. The resulting groups of combined modules are interdigited and interconnected to each other in chain fashion through the use of rods or pins 22. The pins or rods 22 may be made of metal or plastic appropriate for the load and usage conditions such as temperature and other environmental factors.

As best shown in FIG. 4, the slot type apertures 16 in the plurality of second projections 14 of each of the modules 10 and 10′ makes it possible for the resulting belt or chain to traverse a curved path. Thus, the portion of the rod 22 toward the center of the curvature of the curved path will tend to move forwardly in the slotted apertures 16 with the outer end of the rod 22 remaining seated against the rearward end of the outermost slotted aperture 16. Under such conditions, the load will tend to be transferred to the projections 13 and 14 at the outside of the curve and in order to insure that the increased load can be handled at the outside of the curve, a plurality of plates 24 interconnect the outer ends of the rods 22 with each other. As best shown in FIG. 5, the plates 24 have a generally cylindrical aperture 25 in the forward end thereof and a slotted aperture 26 in the trailing end thereof. Thus the plates 24 only come into play when the belt is traversing a curved path in order to provide additional strength at the outside of the curve. The length of the plates 24 are equal to the width of the modules 10 and 10′ and the height of the plates 24 are preferably equal to the thickness of the modules 10 and 10′. The plates 24 may be made of metal or plastic appropriate for the load and environmental conditions to which they will be exposed in use.

Referring again to FIG. 4, the rods 22 may be spring-loaded if desired as by means of compression springs 28 to facilitate the movement of the pairs of modules 10 with respect to each other from their normal position toward the position shown in FIG. 4 under conditions of extreme curvature. In addition, the springloading provided by the compression springs 28 reduces transverse displacement of the modules with respect to each other under extreme curvature conditions.

Referring to FIG. 6, a module 30 identical to the module 10 but omitting the ridges 19 is shown. Thus, the module 30 includes the elongated body 12 and the projections 13, 13′ and 14 of the module 10 but omits the ridges 19 which are formed on the projections of the module 10. The embodiment 30 is preferred for ease of manufacture while maintaining satisfactory provision for the flow of fluids and gases about a product carried on top of the module 30. To this extent, the module 30 is preferred over the module 10.

Referring to FIGS. 7 and 8, a fragmentary end view and a cross-section thereof respectively, of an alternate embodiment 30′ of the module 30 is shown which includes a downwardly projecting guide member 32. The guide member 32 comprises a downward extension formed integrally with the projection 14 and body 12. The guide member 32 is adapted to engage an appropriate track or guide structure (not shown) during travel of a belt including the module 30′. The use of a guide member 32 on a selected number of the modules is required where a belt must follow a curved path and is highly desirable where the belt is subjected to side loading or unloading of heavy products. To this end, modules identical to modules 10 and 10′ as well as modules 30 may be made with guide members 32 identical to those of modules 30′. Such modified modules 10 and 10′, may be intermixed with normal modules 10 and 10′, just as modules 30′ may be intermixed with modules 30, and distributed along a given belt as necessary and desirable to insure satisfactory guidance through curved paths or to resist side loading and unloading forces in operation.

Referring to FIG. 12, the mounting structure for guiding a belt made of a preferred embodiment of modules 30′ through a left hand curve is illustrated. As shown in FIGS. 12-14, the preferred embodiment of module 30′ includes a modified guide member 32′ which is provided with a hold down tab 33 projecting from its outside surface at the free end thereof. Such hold down tab 33 is designed to cooperate with an inwardly flanged wearstrip 34 mounted at the side of the belt along the periphery of the curved path to be followed by the belt on the load bearing flight thereof. It will be understood that the belt may tend to rise along one side or the other as it passes through a curve. Thus, as shown in the top portion of FIG. 12, modified guide members 32′ including hold down tabs 33 are provided on the free ends of the modules 30′ at each side of the belt and inwardly flanged wearstrips 34 are provided along both the inner and outer peripheries of the curved path to be followed by the belt.

The belt is guided through the curved path by a wearstrip guide 35 mounted under the load bearing flight and above the return flight thereof. The wearstrip guides 35 are positioned along opposite sides of the belt so that the inside surface of the guide member 32′ at the outside of the curve will abut the wearstrip guide 35 adjacent thereto, but the inner surface of the guide member 32′ at the inside of the curve will be laterally spaced from the wearstrip guide 35 which is adjacent to it. This positioning of the wearstrip guides 35 is necessary in order to facilitate the spreading of the ends of the serial modules 30′ at the outside of the curve due to frictional forces while allowing the ends of the serial modules 30′ at the inside of the curve to move freely toward each other without opposing frictional forces.

As indicated by the dotted lines in FIG. 12, a guide member 32 (which need not have a hold down tab thereon) may be provided at the inner end of the outer modules 30′ of the belt. Again a wearstrip guide 35 is positioned to abut the surface of the guide member 32 facing the inside of the curve, causing the serially interconnected modules 30′ to pivot about the guide member 32 and thus cause frictional forces to facilitate the movement of the serially connected modules 30′ with respect to each other as required in passing through the curve.

As shown in FIG. 12, the mounting structure for the belt preferably includes additional wearstrip support members 36 positioned beneath the load bearing flight of the belt throughout its travel in order to balance the loading stresses on the belt. Similarly, wearstrip support members 38 are preferably positioned beneath the return flight of the belt against the formation of a catenary which would tend to introduce unnecessary stress into the belt and frictional losses into the engagement of the belt with the drive or idler sprockets at the ends of the return flight.

It will be understood that belts formed of modules 10, 30 and 30′ are adapted to be driven in one direction only. Referring to FIGS. 9 through 11, a module 40 embodying this invention which is capable of being interconnected into a belt that may be driven in either direction is shown. Thus, the module 40 comprises an elongated body 42 having a plurality of first equally spaced projections 43 extending integrally from one side thereof. A plurality of second equally spaced projections 44 extend integrally from the opposite side of the elongated body 42 in symmetric interdigital location with respect to the plurality of first projections 43. Each of the first projections 43 have a generally cylindrical aperture 45 extending therethrough transversely of the projection 43 with the axes of all the apertures 45 being coaxial with each other. Similarly, each of the second projections 44 have a generally cylindrical aperture 46 extending transversely therethrough with the apertures 46 being in coaxial alignment with each other.

A first plurality of openings 47 are formed through the elongated body transversely of the coaxial axes of the apertures 45 and 46 with each opening being located between a different pair of the second projections 44. According to this embodiment of the invention, the openings 47 do not merge with the spacing between the projections 44. Also, according to this embodiment of the invention, a further plurality of openings 47' are formed through the body 42 of the module 40 extending transversely of the coaxial axes of the apertures 45 and 46 with each of the second plurality of openings being located between a different pair of first projections 43. The plurality of second openings 47' are physically separated from the spacing between the first projections 43.

As best shown in FIG. 10, each of the openings 47 is provided with a generally cylindrical driving surface 48 on the end wall thereof at the root of the projections 43. Such generally cylindrical driving surface has a radius of curvature which is about equal to three tenths of the spacing between the axes of the apertures 45 and 46. Similarly, as shown in phantom in FIG. 10, the openings 47' have a driving surface 48' formed on the end wall thereof at the root of the projections 44 which driving surface has a radius of curvature substantially equal to three tenths of the distance between the axes of the apertures 45 and 46. Thus the driving surface 48' of the apertures 47' are adapted to be engaged by the teeth of a sprocket wheel to drive a belt comprised of a plurality of modules 40 interconnected in chain fashion by pins or rods (not shown) in the downward direction as shown in FIG. 9. The driving surface 48 provided in the openings 47 are adapted to be engaged by the teeth of a sprocket wheel to drive such a belt in the upward direction as shown in FIG. 9. It will be understood that driving surfaces in more than one of the openings 47 and 47' may be engaged by one or more teeth of each of one or more sprocket wheels to drive the belt in either direction. Also, as shown in FIG. 10, the ends of the apertures 47 and 47' opposite from the driving surfaces 48 and 48', respectively, may be provided with an auxiliary driving surface 50 having a radius of curvature which is about equal to three tenths of the spacing between the axes of the apertures 45 and 46 to enable reversing of the belt drive under low load conditions regardless of whether openings 47 or openings 47' are being engaged by the teeth of the sprocket wheel.

Referring to FIG. 11, it will be seen that the side walls of the openings 47 and 47' may be tapered to enhance the flow of liquids and gasses through a belt comprised of the modules 40. The modules 40 as well as the modules 10, 10',30 and 30' are preferably molded of plastic which may be fiber reinforced. The plastic may be selected to be resistant to the particular processing steps to which products carried by belt composed of such modules are to be subjected. A belt formed of modules 10,10',30, 30' and 40 will be inherently easy to clean and sterilize. In addition, belts composed of modules 10,10',30, 30' and 40 will be inexpensive and easy to fabricate having a minimum of parts. The simplicity of the modules 10,10',30, 30' and 40 insures that no product or product fragments will be collected therebetween.

It is believed that those skilled in the art will make obvious modifications in the embodiments of this invention shown in the drawing without departing from the scope of the following claims.

What is claimed is:

1. An endless intergally driven plastic conveyor belt installation including a curved load bearing flight or section, a correspondingly curved return flight or section and a support structure interposed between said load bearing flight and said return flight, said integrally driven plastic conveyor belt comprising a plurality of similar interdispsersed elongated molded plastic bodies and a plurality of cylindrical rods, each of said plurality of elongated bodies having:

a plurality of first equally spaced projections extending integrally from one side of said elongated body, each of said first projections having an aperture therethrough transversely of said projection, said apertures through said first projections being coaxial with each other;

a plurality of second equally spaced projections extending integrally from the opposite side of said elongated body in symmetric interdigital location with respect to said plurality of first projections, each of said second plurality of projections having a slot therethrough transversely thereof, said slots through said second plurality of projections providing rotational axes in coaxial alignment at the ends thereof remote from said elongated body;

a pair of guide members, one formed integrally with one of said second plurality of projections at each end of said elongated body, each said guide member comprising a plate extending transversely of said elongated body and downwardly from the nonload bearing surface thereof in position to laterally engage a stationary surface below the conveyor belt;

said plurality of first projections of each of said plurality of elongated bodies being interdigited with said plurality of second projections of a differnet one of said plurality of elongated bodies with said apertures and slots respectively through said first and second pluralities of projections in alignment and with a different one of said plurality of rods received therethrough to form said endless integrally driven plastic conveyor belt;

said support structure comprising:

a plurality of wearstrip means engaging and supporting the under side of said load bearing flight of said conveyor belt including a first supporting wearstrip means positioned so that the inside surface of the guide member at the outside of a curve will abut said stationary surface of the first wearstrip means adjacent thereto with the other of said pair of guide members of each elongated body being free of contact with the stationary surface of the other supporting wearstrip means, whereby the lateral position of each elongated body of the conveyor belt is maintained as the belt travels through the curve and the ends of the elongated bodies at the inside of the curve are allowed to freely cluster together without opposing frictional forces.

2. An endless integrally driven plastic conveyor belt installation as claimed in claim 1 wherein each of said elongated bodies further comprises at least one integrally formed hold down tab member comprising a flange extending in a plane parallel to said elongated body, and wherein said support structure further comprises at least one inwardly flanged wearstrip member extending along said curved load bearing flight, said inwardly flanged wearstrip members being positioned to be contacted by said hold down tab members upon upward movement of said hold down tab member.

3. An endless integrally driven plastic conveyor belt installation including a curved load bearing flight, a correspondingly curved return flight and a support structure interposed between said load bearing flight and said return flight, said integrally driven plastic conveyor belt comprising a plurality of similar elongated molded plastic bodies and a plurality of cylindrical rods, each of said plruality of elongated bodies having:

a plurality of first equally spaced projections extending integrally from one side of said elongated body, each of said first projections having an aperture therethrough transversely of said projection, said apertures through said first projections being coaxial with each other;

a plurality of second equally spaced projections extending integrally from the opposite side of said elongated body in symmetric interdigital location with respect to said plurality of first projections, each of said second plurality of projections having a slot therethrough transversely thereof, said slots through said second plurality of projections providing rotational axes in coaxial alignment at the ends thereof remote from said elongated body;

a guide means, formed integrally with at least one of said second plurality of projections in the same position on each of said elongated bodies and located at a position substantially between the center of the elongated body and the end of the elongated body which is on the outside of the curved flight path, said guide means comprising at least one plate extending transversely of said elongated body and downwardly from the non-load bearing surface thereof in position to laterally engage a stationary surface below the conveyor belt;

said plurality of first projections of each of said plurality of elongated bodies being interdigited with said plurality of second projections of a different one of said plurality of elongated bodies with said apertures and slots respectively through said first and second pluralities of projections in alignment and with a different one of said plurality of rods received therethrough to form said endless integrally driven plastic conveyor belt;

said support structure comprising:

a plurality of wearstrip means engaging and supporting the under side of said load bearing flight of said conveyor belt and including a supporting wearstrip means having said stationary surface, adapted to contact the radially inner major surface of the guide mens of each said elongated body as the belt travels along a curve, therebeing no further lateral enggement contact with the remaining supporting wearstrip means, whereby the ends of the elongated bodies at the inner side of the curve are allowed to freely cluster together substantially without opposing frictional forces.

4. An endless integrally driven plastic conveyor belt installation in claim 3, wherein each of said elongated bodies further comprises at least one integrally formed hold down tab member comprising a flange extending in a plane parallel to said elongated body, and wherein said support structure further comprises at least one inwardly flanged wearstrip member extending along said curved load bearing flight, said inwardly flanged wearstrip members being positioned to be contacted by said hold down tab members upon upward movement of said hold down tab member.

5. And endless integrally driven plastic conveyor belt isntallation as in claim 4, wherein the hold down tab member is integral with the guide member.

6. An endless integrally driven plastic conveyor belt installation as in claim 3, wherein the guide means are located generally centrally on the elongated bodies.

* * * * *